Nov. 22, 1949     D. G. REMPEL     2,488,935
VULCANIZING APPARATUS
Filed Aug. 26, 1944     5 Sheets-Sheet 1
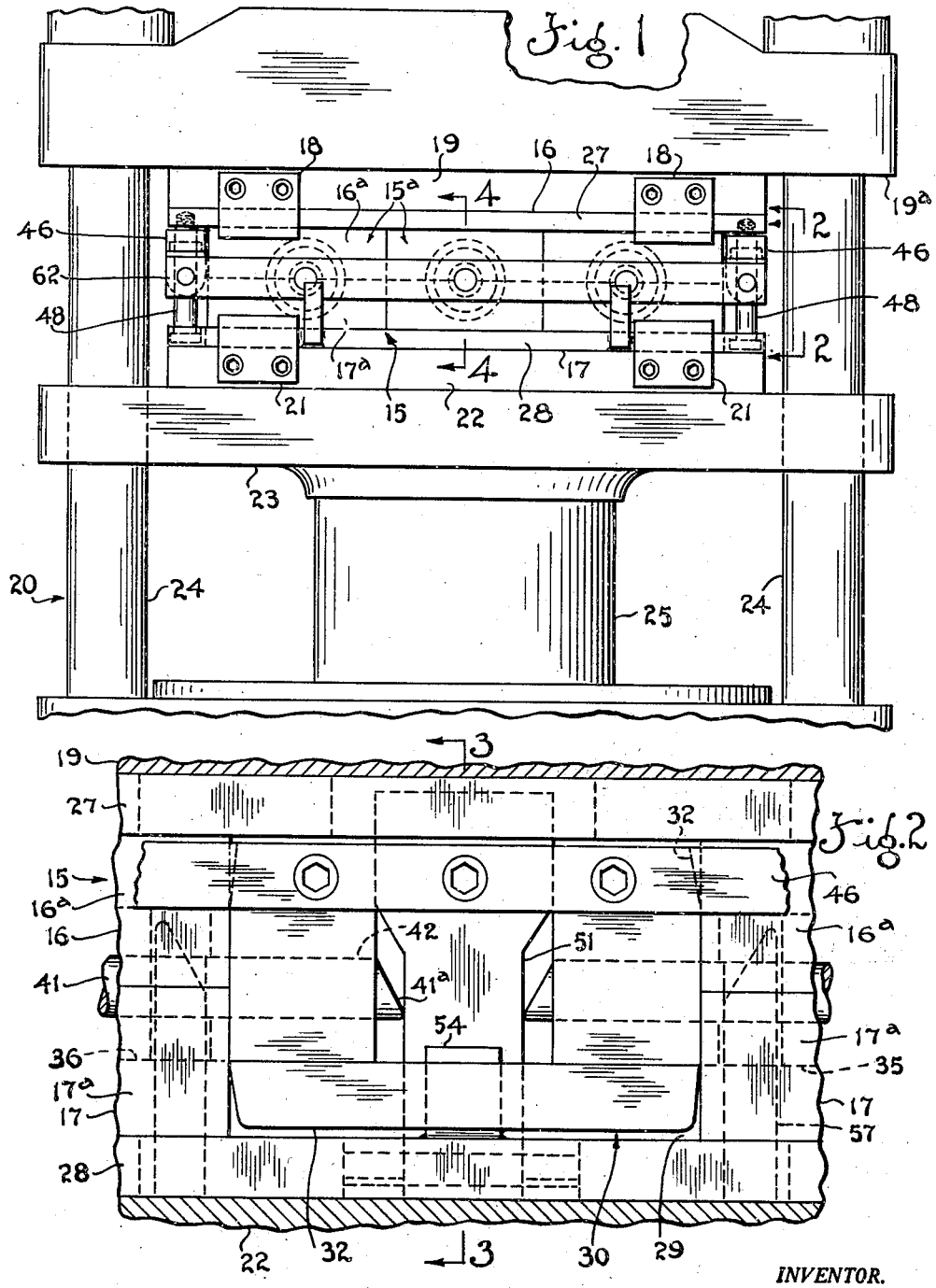

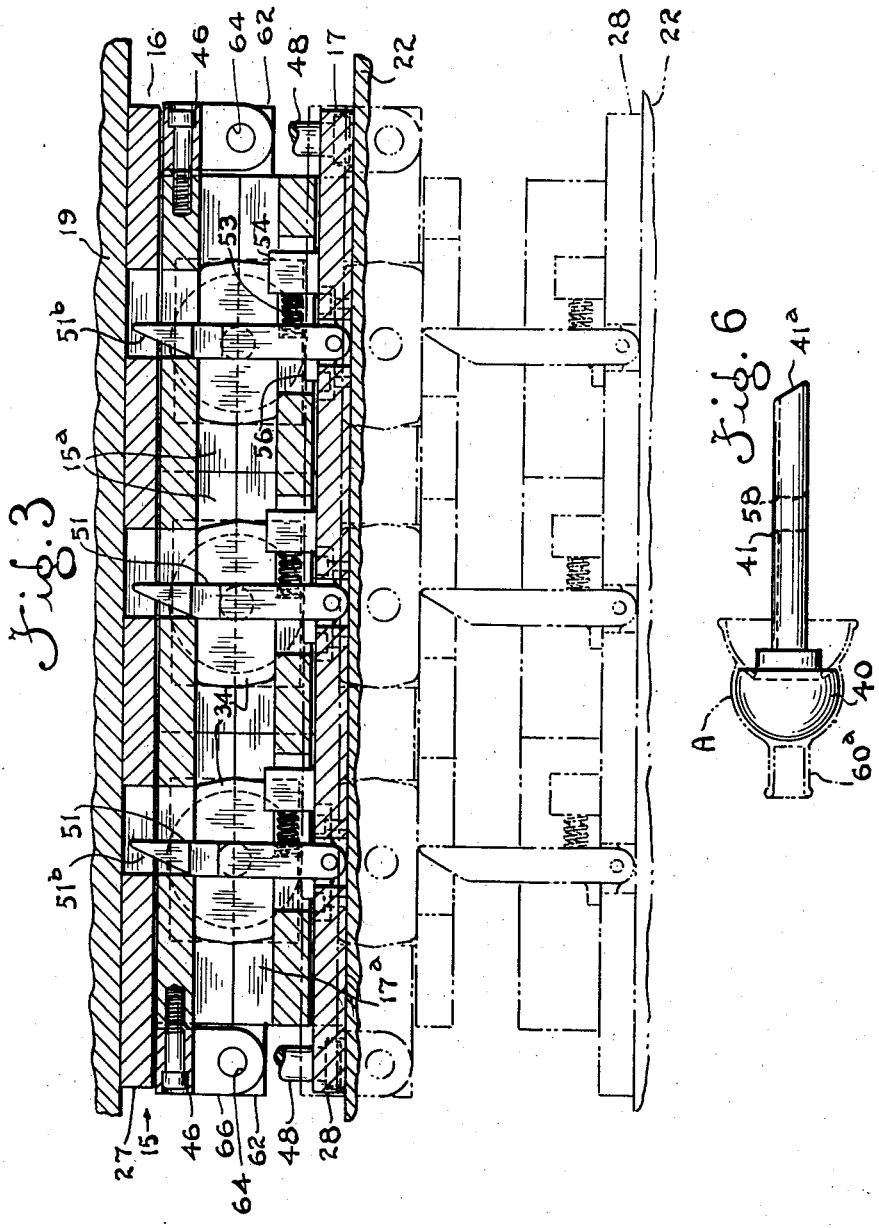

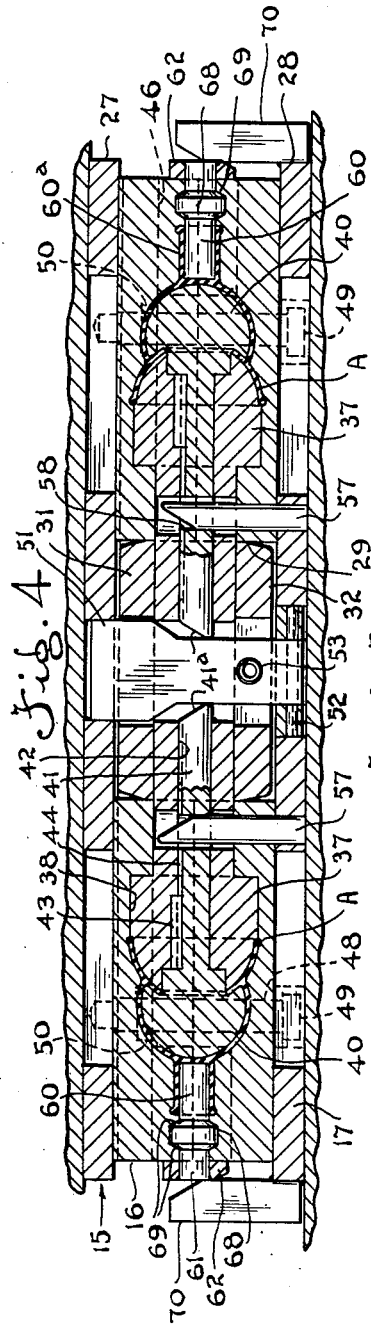
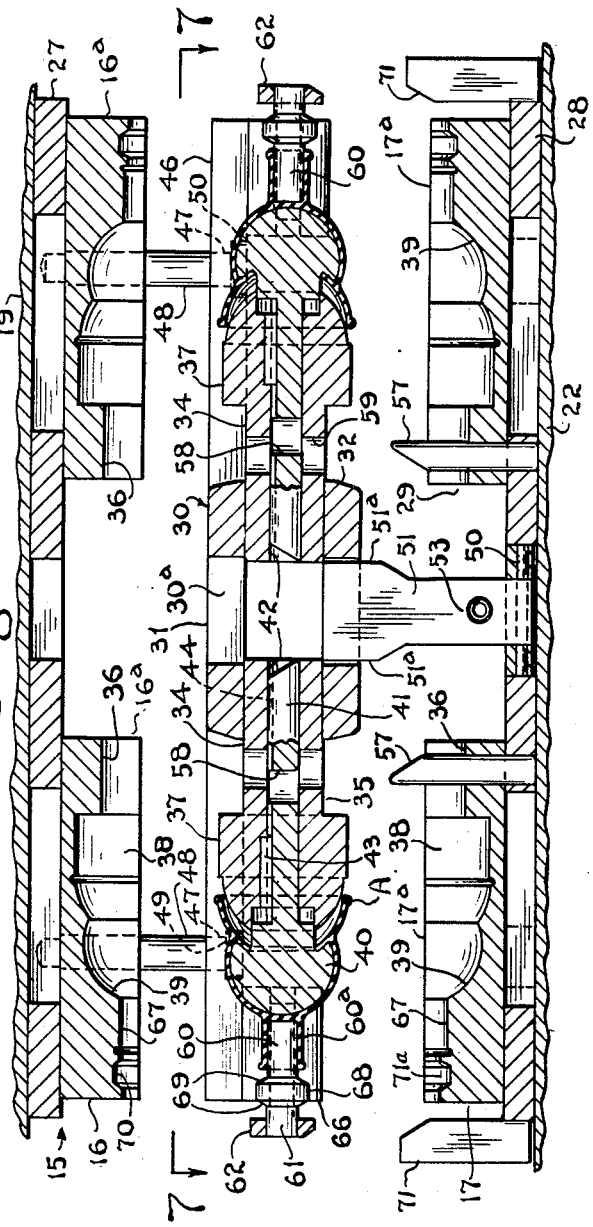

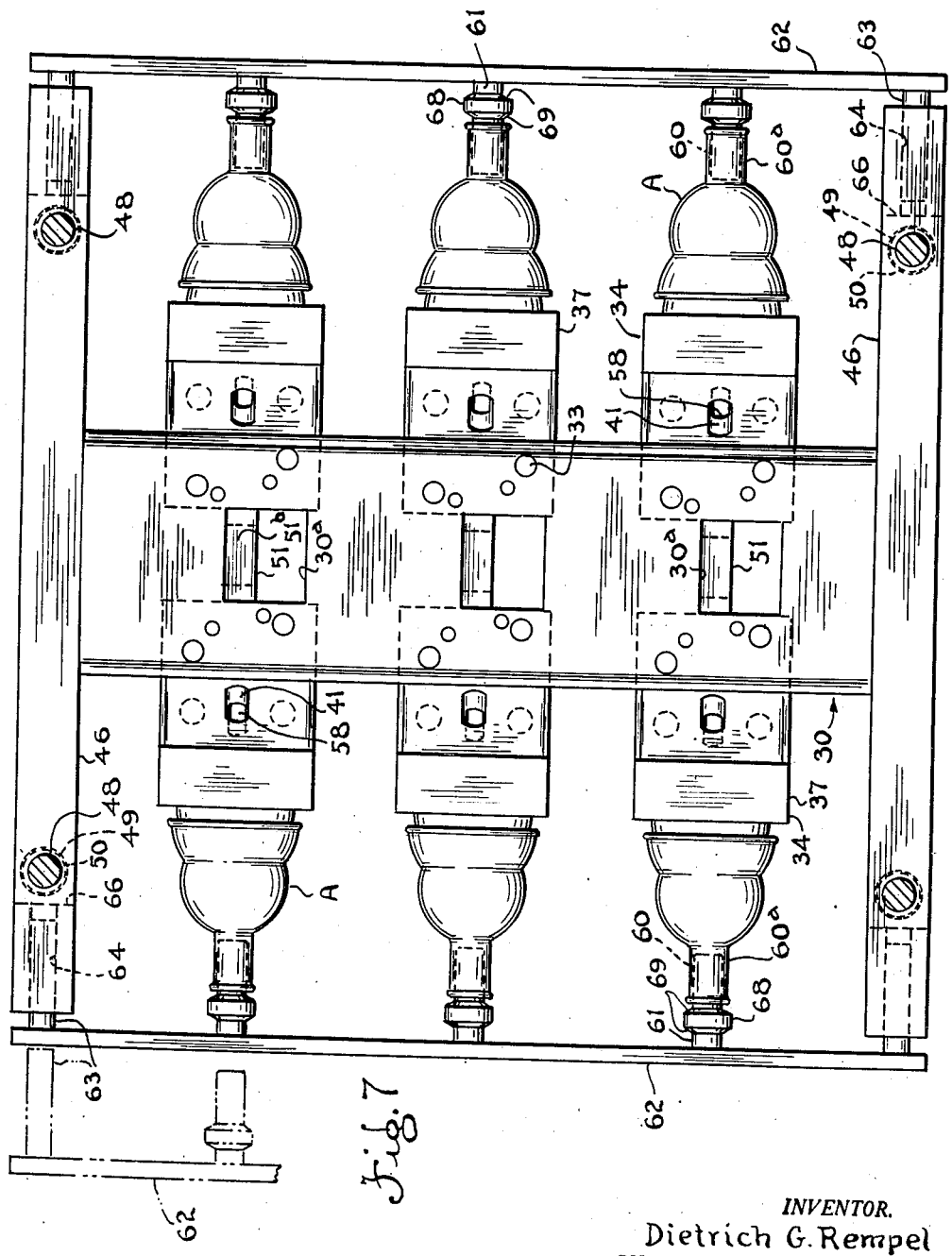

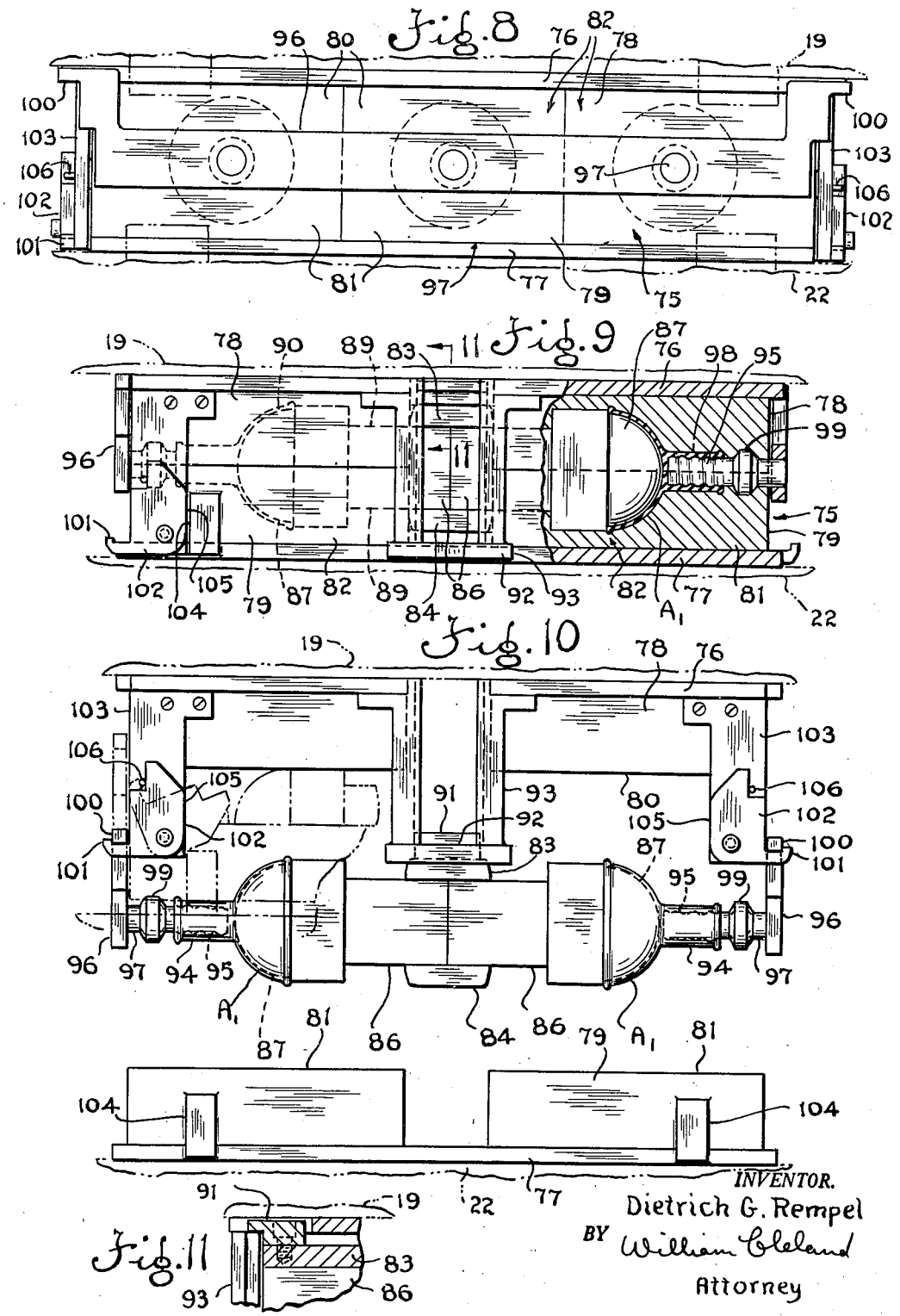

Patented Nov. 22, 1949

2,488,935

UNITED STATES PATENT OFFICE 2,488,935

VULCANIZING APPARATUS

Dietrich G. Rempel, Akron, Ohio, assignor to The Sun Rubber Company, Barberton, Ohio, a corporation of Ohio Application August 26, 1944, Serial No. 551,279

7 Claims. (Cl. 18—17)

This invention relates to vulcanizing or like article-forming apparatus, and in particular relates to vulcanizing molds.

One object of the invention is to provide an improved sectional mold of unitary construction adapted to be supported between relatively movable press members, with self-contained means provided in the mold unit to be self-operating with relative movement of the mold sections to shift relatively shiftable parts of an article-forming core member, thereby facilitating breaking articles from the core members for ready removal of the same, and greatly reducing the operational change cycles.

Another object of the invention is to provide apparatus of the character described in which a part of the core member is removable from the mold with a formed article retained thereon, with a consequent saving of time and labor due to the fact that while the article is being stripped from said removed core part a separate similar core part may be substituted for a subsequent article-forming operation of the mold.

Another object of the invention is to provide an improved core construction in apparatus of the character described, by which it is only necessary to remove a relatively small part of the core in order to remove an article formed in the mold, thereby materially reducing the weight of parts required to be handled by the operator during each article-forming cycle, and also minimizing wear and tear and maintenance on the mold.

Still another object of the invention is to provide in apparatus of the character described improved means automatically operable, jointly or separately, as desired, to move primary and secondary core members to intermediate positions between the mold sections in an open position thereof.

Still another object of the invention is to provide in apparatus of the character described secondary core means, as described above, by which a plurality of secondary cores may be removed from the mold as a unit, with improved means provided to permit placement of the secondary core members in the lower mold section without interfering with the automatic means for positioning the core members in the intermediate position thereof.

These and other objects of the invention will be manifest from the following brief description and the accompanying drawings.

Of the accompanying drawings:

Figure 1 is a front elevation, partly broken away, of a platen press having therein a mold embodying the invention, the press being closed.

Figure 2 is a fragmentary view, on a greatly enlarged scale, as viewed substantially at line 2—2 in Figure 1, at the center portion of the press.

Figure 3 is a cross-section, on a larger scale than Figure 1, taken substantially on line 3—3 of Figure 2.

Figure 4 is an enlarged cross-section taken substantially on line 4—4 in Figure 1.

Figure 5 is a view similar to Figure 4, but illustrating the mold in fully open position.

Figure 6 is a detail view of a secondary core removed from the mold.

Figure 7 is a plan view of the core supporting frame for the core members, as viewed on line 7—7 of Figure 5.

Figure 8 is a front elevation, corresponding to Figure 1, illustrating a modified form of mold embodying the invention.

Figure 9 is a side elevation, partly broken away and in section, as viewed from either side of Figure 8.

Figure 10 is a view similar to Figure 9, but illustrating the mold in fully open position.

Figure 11 is a fragmentary cross-section taken on line 11—11 of Figure 9.

Referring particularly to Figures 1 to 7 of the drawings, the numeral 15 designates a unitary cavity mold construction having self-contained automatic features embodying the invention herein, as will be subsequently described. Mold 15 has upper and lower mold sections 16 and 17, respectively, adapted to be in mating or registering relation when the mold is closed. Upper mold section 16 may be releasably secured, as by means of clamps 18, 18, to an upper platen 19 secured to a fixed head 19ᵃ of a hydraulic platen press 20 of known type (see Figure 1), while the lower mold section 17 may be similarly secured, by clamps 21, 21, to a lower platen 22 carried by a cross-member 23 which is vertically movable on guides 24, 24 by a hydraulic ram 25. The platens 19 and 22 may be heated by means of steam or other medium, from a suitable source, to heat the mold sections for vulcanizing operations to be described later.

The present improvements may be incorporated into a single-cavity type mold, but for the purposes of illustrating the invention a multiple type mold will be described. Accordingly, the mold 15 may comprise two spaced rows of relatively small cavity molds 15ᵃ, 15ᵃ, the upper and lower halves or sections 16ᵃ, 16ᵃ and 17ᵃ, 17ᵃ of which are secured by suitable means (not shown)

to upper and lower mold plates 27 and 28, respectively, which in turn are secured to the press platens 19 and 22 by the forementioned clamps 18 and 21 engaging over the edges of said plates.

Mounted in the space 29 between the two rows of molds 15ᵃ may be a floating core-supporting frame 30, comprising vertically spaced bars 31 and 32, between which are clamped, by means of bolts 33, two oppositely disposed series of horizontally extending core members 34, 34 having portions 35 thereof receivable in mating recesses 36, 36 in the mold halves 16ᵃ, and 17ᵃ for accurately supporting or mounting the core members between the same in the closed position of mold 15, as best shown in Figure 4. In this closed position primary article-forming cores 37 of core members 34 extend freely into the small molds to be positioned in spaced relation to correspondingly shaped cavity portions 38 thereof.

Secondary cores 40, 40 (see Figure 6) may be removably mounted in association with the primary cores 37 to be in spaced relation to correspondingly shaped cavity portions 39 of the mold. To this end, secondary cores 40 may have stems 41 horizontally slidable in bores 42 in core members 34, relative rotation being prevented by keys 43 in the core members 34, being slidably received in keyways 44 provided in stems 41, as shown in Figures 4 and 5. By means of these separable primary and secondary cores, rubber or like articles, such as the double chambered, suction-type drain cleaner illustrated in the drawings, may be readily removed from the molds, as will be described.

To facilitate operational loading and unloading of the mold, supporting means having a lost-motion action is provided to retain the cores in an intermediate position between the mold sections when the mold is fully open, as best shown in Figure 5. For this purpose bars 46, 46 may be secured to opposite ends of the top bar 31 of floating support 30, to extend freely along opposite sides of the mold in horizontal direction. Each bar 46 is provided with spaced apertures 47 for vertically slidably receiving depending pins 48, 48 threaded into top mold plate 19, heads 49 on the lower ends of the pins being engageable in recesses 50 in the bottom sides of bars 46 to retain supporting frame 30 and the cores carried thereby in said intermediate position in the fully open position of the mold (Fig. 5). The recesses 50 are provided to permit maximum relative movement of the mold sections without affecting the unitary construction of the mold, or the self-contained automatic features thereof, just described. Thus, opening movement of the mold is utilized automatically to move the cores to the intermediate position, the same being carried downwardly with the lower mold by gravity during the initial opening movement, until bars 46 engage heads 49 of pins 48. Conversely, when the lower mold section is moved toward closed position it will pick up the core supporting frame 30 at about the half-way point of movement and carry it to the fully closed position.

For automatically shifting the secondary cores 40 to break articles A, vulcanized in molds 15ᵃ, away from primary cores 37 cam members 51, 51, one for each pair of oppositely disposed molds 15ᵃ, are pivoted at 52 on suitable bearings in recesses in bottom mold plate 28 to be swingable toward one side of the mold, these cams being normally held in free upright position by means of a spring 53, between each cam and a fixed block 54 on said bottom plate, yieldingly to urge a stop member 56 on the opposite side of the cam against the bottom plate. Suitable apertures 30ᵃ, 30ᵃ are provided up through frame 30 to permit passage for cam 51 as the frame is moved vertically. Projecting or off-set portions 51ᵃ, 51ᵃ at the upper portions of opposite edges of cam members 51 are engageable with beveled end portions 41ᵃ of oppositely disposed pins 41, upon opening movement of the mold sections 16 and 17, to urge the secondary cores 40 outwardly of the primary cores 37, thereby effectively to break the article A away from the latter.

The secondary cores 40 may be automatically returned to normal closed position by closing movement of the mold, by means of beveled upright cam pins 57, 57 secured to the bottom mold section, as shown, for engagement with edges of apertures 58, 58 in stems 41, cooperating apertures 59, 59 being provided in portions 35 of core member 34 to permit free movement of the cam pins in apertures 58. The cam pins 57 and cams 51 are so designed and arranged that the secondary cores will not be so returned until the ends of pins 41 pass below the projecting cam portions 51ᵃ, and the latter cam portions are also so arranged that the secondary cores will not be moved outwardly as described until sufficient clearance is provided between the same and certain parts of the lower mold section.

The top portions of cams 51 are beveled or curved at one side face thereof, as indicated at 51ᵃ in Figure 3, so that as closing movement of the mold is started, said beveled portions 51ᵃ will engage side portions of the projecting pin ends 41ᵃ (Figure 4) to move the cams aside against the yielding action of springs 53. When the reduced off-set portions of the cams are opposite said pin ends the cams will be urged to full upright positions against stops 56, by the springs 53. This action prevents fouling of the cams 51 with the ends of the pins when the mold is closed.

The floating frame 30, with its side bars 46 extending forwardly and rearwardly of the mold 15, may be utilized for removably supporting two series of cores 60, 60 which may also be termed secondary cores, these cores being arranged at both the front and rear of the mold for forming socket members 60ᵃ, 60ᵃ on the articles A for receiving handles (not shown) therein. Obviously the socket members 60ᵃ, being open only at the outer end, could not be formed by a part provided on secondary core 40, for example. Accordingly, pins 61, 61 the free ends of which comprise the cores 60, may be mounted on bars 62, 62 on each of which are spaced end pins 63, 63 adapted to be slidably received in bores 64, 64 in bearing blocks 66, 66 which are suitably secured to the ends of side bars 46, on the undersides thereof. The upper and lower molds 16ᵃ, and 17ᵃ are provided with mating recesses 67, 67 with which the cores 60 cooperate to form the socket portion 61, as best shown in Figure 4.

Enlargements 68, 68, having oppositely beveled portions 69, are provided on core pins 61 as shown, to be engageable in similarly beveled mating recesses 71 and 71ᵃ in the upper and lower molds 16ᵃ, and 17ᵃ, the arrangement being such that when the mold sections come together in closing the interengaging beveled portions will be self-operating to position the cores 60 in the molds. Slight play may be provided between these cooperating beveled portions, so that cams 70, 70 secured to bottom mold plate 28, at the front and rear of the mold, are engageable with core bars 62 as the mold sections are moving to fully closed position, to urge the cores inwardly to positive accurate positions in the molds 15a, the cams 70 being synchronized with cams 51 so that cores 60 will move in unison with inward movement of secondary cores 40. When the mold is opened, outward movement of the secondary cores 40, as described above, will urge cores 60 and supporting plates 62 outwardly to corresponding extent (see Figure 5).

In the operation of the unitary mold described above for vulcanizing articles A of rubber or like material, the press 20 is operated to lower movable platen 22 to open position, as shown in Figure 5, and in chain-dotted lines in Figure 3, the core supporting frame 30 (see Figure 7) then being in its convenient intermediate position, as retained by the heads 49 of pins 48 engaging side bars 46. In this position bare secondary cores 40 are placed by inserting the stems 41 thereof in bores 42 of the primary cores, as far as they will go so that the cam pins 57 will be certain to engage in openings 58 of the stems when the mold is subsequently closed. The cores 60 are then placed by inserting pins 63 of plate 62 in the bores 64 of blocks 66 carried by frame 30, until the plates engage the outer faces of the blocks. Thus the cores in Figure 5 will be approximately in the relative positions shown in Figure 4, when the operator will place pieces of rubber or like vulcanizable material on top of the cores and in the lower mold cavities as necessary.

Next, the press 15 is operated to move platen 22 upwardly toward the closed position, shown in Figures 1, 2, 3 and 4. In moving toward approximately a half stroke position, the cams 70 and 57, engaging bars 62 and stems 41, respectively, urge the secondary cores 40 and socket cores 60 inwardly to positive location to be accurately positioned in the corresponding cavity portions 67 and 39 of the lower molds 17a, inward movement of stems 41 being permitted by yielding engagement of cams 51 as previously described. When the lower platen 22 moves to said approximate half stroke position the portions 35 of core members 34 are accurately received in recesses 36 of the lower mold sections 15a, thereby to support frame 30 and associated core elements for the remainder of the upward stroke. In this manner the mold is self-operating by its closing movement for positively locating the cores for the closed position of the mold, as best shown in Figure 4.

After the vulcanizing period, during which the articles A formed in the molds are under the influence of heat supplied through the steam or otherwise heated platens 19 and 22, the press is operated to move platen 22 downwardly. Shortly after the platen starts to move down the projections 51a will engage the beveled projecting ends 41a of stems 41, to break secondary cores 40 with articles A thereon, outwardly away from primary cores 37, the core supporting bars 62 being urged outwardly at the same time by engagement of the ends of the cores 60 with the finished articles A. As the platen 22 continues toward fully open position, core supporting frame 30 is retained by the heads on pins 48 in the intermediate position best shown in Figure 5, or in chain-dotted lines in Figure 3.

In the intermediate position of frame 30, the bars 62 with cores 60 thereon are easily removed, thereby to permit removal of the separate secondary cores 40 with the completed articles A thereon. By reference to Figure 6 it will be readily seen that the articles may easily be flexed to strip them from the cores 40, and the latter operations may be accomplished along with other operations or treatments as necessary while another set of cores 40 is being positioned in the molds to start another cycle of operation as described above.

It will be readily seen, therefore, that by means of these self-contained, self-operating features, only part of the article-forming cores are required to be removed from the mold, thereby greatly reducing operating time in various respects, and also substantially reducing handling of mold parts, with resulting reduction in maintenance costs. By means of this construction, also, it is possible to manufacture articles of complex nature, such as the articles A shown. Similar apparatus has also been highly successful in the production of such complex articles as gas masks, high-pressure masks, dust respirators, etc., and may be utilized for economical production of many other articles ordinarily difficult and expensive to manufacture.

Referring now to Figures 8 to 11 of the drawings, which illustrate a modified form of the invention, the numeral 75 designates a unitary mold substantially like mold 15, except for certain differences in the self-operating features thereof.

The mold 75 in general comprises upper and lower mold plates 76 and 77 of upper and lower mold sections 78 and 79, respectively, to which plates are secured upper and lower mold halves or sections 80 and 81 of a plurality of small cavity molds 82 arranged to be in two spaced rows, as before. Between said rows of molds 82 may be a pair of laterally extending, vertically spaced bars 83 and 84 between which are clamped oppositely disposed core blocks 86, 86 having cores 87 on the outer ends thereof, recesses 89, 89 being provided in the mold halves 80, and 81 for accurately positioning the cores in mold cavities 90, 90 in spaced relation to the surface thereof for forming, for example, a single-chambered, suction-type drain cleaner $A_1$.

For retaining the cores 87 in a position intermediate of the upper and lower mold sections 80 and 81, in the open position shown in Figure 10, hooked members 91 are provided at opposite ends of top bar 83 for engaging cross-members 92 of U-shaped brackets 93, secured to top plate 76 at opposite sides of the mold 75. This lost-motion mechanism is self-operating in substantially the same manner as the lost-motion retaining mechanism previously described in connection with Figures 1 to 7, so that further description thereof is deemed unnecessary.

For forming a handle socket 94 on article $A_1$ separate supporting frames or bars 96, 96 may be provided, each having a series of core pins 97, 97 on the free ends of which are socket-forming cores 95 adapted to be positioned in corresponding mating cavity portions 98, 98 in the small molds 82. Double-beveled enlargements 99 similar to the enlargements 68 previously described, are provided on core pins 97 for self-positioning the cores 95 when mold 75 closes.

As will be seen by particular reference to Figure 10, it is necessary to provide means for moving the cores 95 to an intermediate position at the same time as cores 87 are so moved, when the mold is opened. For this purpose the frames 96 may be provided at opposite ends with laterally outwardly extending fingers 100, 100, arranged to be adjacent the top of the mold in closed position thereof, these fingers being downwardly engageable with forwardly and rearwardly extended hooked portions 101, 101 of cam plates 102, which are pivoted to supporting plates 103 depending from the sides of upper mold section 78, as illustrated in Figure 10. The hooks 101 are arranged closely adjacent the bottom of the mold so that maximum movement of the mold may be utilized.

The cam plates 102 are so shaped and arranged that in the closed position of the mold they are maintained with the hooks 101 thereof extended forwardly and rearwardly, by means of straight sides of guide blocks 104, 104, secured to the sides of the lower mold sections, engaging straight edge portions 105 of the cam plates to hold the same against stop pins 106 on the supporting plates 103 (see Figure 9). At the beginning of a cycle of operation of the mold, however, the mold halves will be in the open, spaced-apart positions thereof shown in Figure 10, which permits placing the cores 95 of the frames 96 in the corresponding series of lower mold sections 79. Obviously this will present the outwardly extended hooks 101 directly in the path of the corresponding fingers 100 of frame 96 below the same when the mold halves are relatively moved together. The pivoted cam plates 102 are so proportioned and shaped that upon closing the mold from the open position thereof shown in Figure 10, but with the empty cores 95, and therefore the frames 96, gravitationally supported by the lower mold halves 79, the fingers 100 of frames 96 will engage the cam hooks 101 from below and thereby pivot said plates 102 out of the way, as indicated at the left of Figure 10 in chain-dotted lines. Upon continued upward movement of frames 96 toward the closed position of the mold, the blocks 104 will engage cam surfaces 105 of cam plates 102 and swing the cam plates back to the normal positions thereof shown in full lines of Figure 10, and with the succeeding opening movement of the mold the hooks 101 will again be in position below the fingers 100 for subsequent movement to the intermediate position for supporting frames 96 in the aforementioned intermediate positions (see Figures 8 and 9). This action permits the operator to load the cores 95 and supporting frame 96 in the lower mold halves before starting to close the mold, without subsequent fouling of the fingers 100 with hooks 101. Pins 106 are also utilized to limit pivotal movement as shown in chain-dotted lines in Figure 10.

The operation of the above-described modified mold construction to produce rubber articles $A_1$ is substantially as described in connection with Figures 1 to 7. The formed articles $A_1$, however, may be removed in series with the frames 96 by lifting the latter over the hooks 101 when the mold is fully open (see Figure 10). Although the frames 96 may be replaced on the hooks after the articles are removed from cores 95 certain advantages may be gained by positioning the cores and frames in the lower mold halves as described above.

Thus has been provided apparatus which accomplishes the aims as set forth in the stated objects of the invention. It is pointed out that the unitary construction of the mold, with the self-operating features incorporated therein, makes it possible to use the same mold in different presses which may be of different types, and different molds may be quickly interchanged in the same or different presses. It should also be readily seen that the mold constructions shown in the drawings will operate as described above when opening and closing of the mold is accomplished in a press which is operable to raise and lower the upper mold section, rather than the lower mold section.

Modifications of the invention may be resorted to without departing from the spirit thereof or the scope of the appended claims.

What is claimed is:

1. Vulcanizing or like article-forming apparatus for use in a press including upper and lower platens, movable in substantial parallelism between a closed position and an open spaced-apart position, comprising a cavity mold unit having upper and lower sections for registry with each other, attaching means on said upper and lower mold sections for releasably securing the same to the respective upper and lower platens of the press, one or more article-forming cores in said mold unit, a supporting member for said core or cores, said member and said mold sections having complemental interengaging portions for supporting the cores in article-forming position within the mold cavities in the closed position of the mold, said supporting member and cores thereby being adapted to be gravitationally moved by being supported on the lower mold section with relative movement of the mold sections, and lost-motion means at substantially spaced points transversely of the mold unit and including elements on said member and said upper mold section arranged to be automatically interengageable with opening movement of the mold sections to retain said member and core or cores thereon in an intermediate position in which the same are substantially spaced from both mold sections in substantial parallelism thereto in the open position of the mold.

2. Vulcanizing or like article-forming apparatus, comprising a cavity mold having upper and lower mold sections, means for relatively moving said mold sections between a closed registering position and an open spaced-apart position, an article-forming core unit, a supporting member for said core unit, said member and said mold sections having complemental interengaging portions for supporting said core unit in article-forming position within the mold cavity in said closed position of the mold, means operable with opening movement of the mold to retain said member and core unit thereon in an intermediate position in which the same are substantially spaced from both said mold sections in said open position of the mold, said core unit including a part relatively fixed with respect to said member and a part separably connected to the relatively fixed part, said core unit being of requisite shape to form the desired article in the mold with an apertured wall in the article formed by adjoining portions of the core parts, said separable core part being separable in said intermediate position of the core unit and member to strip the formed article from the fixed core part.

3. Apparatus as set forth in claim 2, including cam-actuated shifting means operable with opening movement of said mold sections to separate said separable core part to spaced position from the fixed core part.

4. Apparatus as set forth in claim 2, including cam-actuated shifting means operable with opening movement of said mold sections to separate said separable core part from the fixed core part, said separable connection of said separable core part with respect to said fixed core part being such as to permit complete removal of said separable core part from the rest of the core unit with the formed article thereon.

5. Vulcanizing or like article-forming apparatus, comprising a cavity mold having upper and lower mold sections, means for relatively moving said mold sections between a closed registering position and an open spaced-apart position, an article-forming core, a supporting member for said core, said member and said mold sections having interengaging portions for supporting said core in article-forming position within the mold cavity in said closed position of the mold, means operable with opening movement of the mold to retain said member and core thereon in an intermediate position in which the same are substantially spaced from both said mold sections in said open position of the mold, said core including adjoining article-forming core parts one of which is to be separable and removable from the rest of the core to facilitate removal of a formed article from the core, said core being of requisite shape to form the desired article in the mold and having peripheral adjoining portions of said core parts in spaced relation to form an apertured separating wall in the article, said separable core part thereby upon removal of the same from the rest of the core also being removable from the article through the aperture of the separating wall thereof, and means operable upon closing movement of the mold sections to bring said core parts together to article-forming relation.

6. Vulcanizing or like article-forming apparatus comprising a cavity mold having upper and lower mold sections adapted to be in registry when the mold is closed, a supporting member, an article-forming core on said member and having a portion extending from the member in direction outwardly of the mold for article forming cooperation with the mold cavity, said member and core thereon being adapted to be supported by said lower mold section when the mold sections are relatively moved vertically, interengageable elements on said upper mold section and on said member and interengageable to retain the member and core in an intermediate position between the mold sections as the same are relatively moved apart to an open position, a second core adapted to be received in said mold cavity in cooperation with first-named core and having a portion extending outwardly of the mold, a support for said second core attached to said extension thereof, and interengageable portions on said upper mold section and on said support and interengageable to retain the support and second core thereon in a position between the mold sections corresponding to the intermediate position of first-named core as the mold sections are moved to said open position.

7. Vulcanizing or like article-forming apparatus comprising a cavity mold having upper and lower mold sections adapted to be in registry when the mold is closed, a core adapted to be received in said mold cavity and having a portion extending outwardly of the mold, a support for said core attached to said extension thereof, said support and core being adapted to be supported by said lower mold member as the mold members are relatively moved apart to an open position of the mold, spaced members on said upper mold section, spaced elements on said support to be above said spaced members when the mold is closed, said spaced members and spaced elements being interengageable when the mold is opened to retain said support and the core in an intermediate position between the mold sections, whereby said support and core are removable by releasing said spaced elements from said spaced members, said spaced members being shiftably mounted on said upper mold section to be shiftable by upward engagement of said support as the mold sections are moved to closed position with said core and said support supported by said lower mold section, and means being provided on said lower mold section for returning said spaced members to normal position as said mold is closed.

DIETRICH G. REMPEL.

REFERENCES CITED

The following references are of record in the file of this patent:

UNITED STATES PATENTS

| Number | Name | Date |
|---|---|---|
| 560,123 | Daughty | May 12, 1896 |
| 1,101,732 | Daughty | June 30, 1914 |
| 1,321,517 | Frederick | Nov. 11, 1919 |
| 2,059,387 | Nanfeldt | Nov. 3, 1936 |
| 2,124,529 | Lester et al. | July 26, 1938 |
| 2,142,581 | Winegar | Jan. 3, 1939 |
| 2,269,758 | Noronha | Jan. 13, 1942 |
| 2,325,752 | Dodge | Aug. 3, 1943 |
| 2,354,447 | Allen | July 25, 1944 |